Patented May 8, 1951

2,552,291

UNITED STATES PATENT OFFICE 2,552,291

OAT FOOD PROCESS

Eldor G. Rupp, Clarendon Hills, Ill., assignor to The Quaker Oats Company, Chicago, Ill., a corporation of New Jersey No Drawing. Application August 9, 1947, Serial No. 767,861

7 Claims. (Cl. 99—80)

This invention relates to an oat food product and a process of preparing the same. More particularly this invention relates to an improved oat food product of the ready-to-eat breakfast food type.

Corn, wheat and rice have been successfully and extensively used in the preparation of ready-to-eat breakfast foods by flaking, puffing and shredding methods. Products made from these grains have been sold commercially for many years. In the past, however, it has not been possible to prepare a satisfactory breakfast food of the ready-to-eat type from oats. For example, attempts to make oat flakes, puffed oats and shredded oat biscuits by the methods of the prior art result in products which are mealy and fragile and which lack the desired crispness and crunchiness. The prior art oat products of this character become soggy and quickly disintegrate to a mush when placed in cold milk or cream. In other words, the oat products of this character have in the past been relatively unsatisfactory and have limited customer appeal. An additional disadvantage of ready-to-eat breakfast foods prepared from oats by the prior art processes is that they have an undesired flavor and do not tend to be as palatable as corresponding forms of breakfast food prepared from other grains, such as corn, wheat or rice.

Accordingly it is one object of this invention to provide an oat food product having improved flavor and palatability.

A further object of this invention is the provision of an oat product of the ready-to-eat breakfast food type which is characterized by its ability to maintain its tenderness, crispness and crunchiness when immersed in aqueous fluids, such as milk or cream.

A still further object of this invention is the provision of flaked, puffed and shredded oat products of the breakfast food type which have properties that compare favorably with similar products made from other grains, such as wheat, corn or rice.

A still further object of this invention is the provision of a process for preparing an oat food product having the characteristics previously indicated.

The oat food products contemplated by this invention are of the cooked type and comprise oat components as the principal and essential ingredients thereof. The invention is particularly concerned with the preperation of oat flakes, puffed oats and shredded oat biscuits. However, it will be apparent from the following description that the invention may also be applied to other oat food products wherein oats constitute the principal food ingredient, such as other oat breakfast foods, oat cakes, oat bread and other cooked bakery products which may be prepared primarily from oat flour.

The objects of this invention are achieved by subjecting oats or oat ingredients to a defatting operation prior to the time that the oats are cooked and prepared in the final desired form. It has been discovered in accordance with this invention that if dry milled oat ingredients are defatted prior to subjecting them to the customary cooking and other treating operations, a product having improved properties will result. A cooked oat product prepared from defatted oat components has a markedly improved flavor and palatability. When the products contemplated are of the ready-to-eat breakfast food type, the products stand up well during the manufacturing process and commercial handling and such products meet all requirements with respect to their ability to maintain their tenderness, crispness and crunchiness when immersed in cold aqueous fluids such as cream or milk.

The fat or lipoid content of oat grains usually varies between about six and eight per cent by weight. In accordance with this invention it has been found that if a substantial proportion of the fat is removed from the oat components, then they will respond like other cereals to ordinary processing methods. Generally speaking, the greater the reduction in fat content, the more like other cereals the oats become in response to various flaking, shredding or puffing operations. As a practical limit, it is preferred to defat the oat components to such an extent that less than about two per cent by weight of fatty materials remain. Best results are achieved when the defatting process is carried out to reduce the fat content of the oat components to less than about one per cent by weight.

It will be understood that in this specification and the appended claims the words "fat" and "fatty constituents" are intended to mean those glycerides, fatty acids, sterols, phospholipins, lipo-proteins, plant pigments or other lipoids or lipoidal material normally present in oats which may be extracted from the oat components by the various, ordinary employed, fat extracting solvents.

In accordance with one preferred embodiment of this invention, oats are first subjected to a milling operation to remove the cellulosic hulls.

The resulting oat groats ordinarily contain a bran layer through which it has been found it is very difficult to extract the fatty components by solvent extraction. Accordingly it is preferred to disrupt this bran layer by pearling, steel-cutting or rolling the milled oat groats. After disruption of the bran layer, the oat groats are treated with a fat solvent to extract the fats therefrom to a level of less than about two per cent and preferably less than about one per cent. The solvent is then separated from the defatted material and the resulting material may be cooked to form the desired product of this invention. If desired, the milled oat groats may be ground to a flour prior to the solvent extraction step. However, this is usually not desirable or feasible because of the mechanical difficulties involved in a solvent extraction of the finely divided flour-like material.

A large number of solvents may be employed for extracting the fatty constituents of the oat components. Suitable solvents may include the ethers, alcohols, ketones, hydrocarbons or halogenated hydrocarbons, such as ethyl ether, dichloroethyl ether, methyl alcohol, ethyl alcohol, n-propyl alcohol, isopropyl alcohol, acetone, hexane, petroleum ether, ethylene dichloride, carbon tetrachloride, trichloroethylene, carbon disulfide or suitable mixtures thereof. Preferably solvents are used which are readily volatile so that they may be easily and completely separated from the extracted product prior to the cooking step.

The defatted pearled oat groats, steel-cut oats, rolled oats or oat flour is thereafter subjected to a cooking step for preparing a desired oat product. For example, the defatted oat components may be flaked, shredded, puffed or formed into cakes by any of the well known methods which include a cooking step that have been found to be satisfactory with other cereals, such as wheat, corn and rice. As pointed out above, an important feature of this invention is the discovery that excellent products may be prepared from oats if the oat components are previously subjected to a defatting step prior to the cooking operation. By means of this invention it is possible to produce an oat food product which is characterized by excellent texture, good keeping qualities, resistance to absorption of moisture and superiority in flavor and general eating qualities. In respect to the latter, a product may readily be formed which is crisp and crunchy and which on eating will break with a pleasing shortness in the mouth. It is not presently understood why reduction in the fat content of the oats imparts all of the above indicated desirable characteristics to the resulting product and accordingly no explanation will be here attempted. Indeed, the results obtained by the process of this invention are contrary to what might be expected because it could not have been anticipated that improved water resistance, crispness, crunchiness and shortness would be obtained by actually removing some of the fatty components of the oats. Generally speaking, in food products the greater the fat content, the greater the water resistance, and as a matter of fact, shortening is generally added to impart desired crisp and crunchy properties. Accordingly the results here achieved are entirely unexpected.

As previously suggested, the precise method of defatting the oat constituents is not a feature of this invention and any method of solvent extraction may be employed which will readily reduce the fat content of the oats to less than about two per cent by weight and preferably less than about one per cent by weight. The defatting procedure may be carried out on whole milled oat groats if desired. However, in accordance with one embodiment of this invention, it is preferable first to disrupt the bran layer on the individual whole milled oat groat to facilitate solvent penetrability and fat removal from the interior of the groat. Accordingly the process is preferably carried out with oats from which this bran layer has been disrupted by one means or another, such as by steel-cutting, rolling, pearling or other attrition. For example, 150 parts of flaked steel-cut oat groats having a fat content of 6.5 per cent were placed in the percolating chamber of a commercial Lloyd extractor and extracted for three hours with 400 parts of ethylene dichloride. At the end of that time the fat content of the oats was reduced to 0.59 per cent. In another extraction 400 parts of a mixture consisting of 77.5 per cent petroleum ether (boiling point 146–153° F.) and 22.5 per cent isopropyl alcohol were used to extract 150 parts of flexed steel-cut oat groats having a fat content of 6.5 per cent. After extracting for a period of three hours in the percolating chamber of a Lloyd extractor, the fat content of the oat groats was reduced to 0.04 per cent. In a similar manner 150 parts of rolled oats of a fat content of 7.1 per cent were extracted with 400 parts of hexane for a period of three hours, reducing the fat content to 0.88 per cent. Likewise steel-cut oat groats and pearled groats were extracted by the same procedure. In order to reduce the fat content of these substances to less than one per cent, the time of extraction may take as long as 72 hours, depending upon the fineness of granulation or degree of pearling of the oat groats, the composition of the solvent, conditions of extraction, and various other factors.

In order more specifically to point up the advantages of this invention, reference is made to the following examples for purposes of illustration.

*Example 1*

One hundred fifty (150) parts by weight of rolled oats of a fat content of 7.1 per cent were extracted with 400 parts of hexane for a period of three hours thereby reducing the fat content to 0.88 per cent by weight. After extraction the residual defatted rolled oats were steamed with dry steam in order to remove all of the solvent. Thereafter the flakes were pulverized into a flour and the flour was processed to produce oat flakes in accordance with the method described in copending application Serial No. 640,678, filed January 11, 1946, of which the present application is a continuation-in-part.

In accordance with the process disclosed in the said copending application, 120 parts by weight of the defatted oat flour were placed with four parts by weight of salt, four parts of sugar, 10 parts of malt syrup and 70 parts of water in the mixing chamber of a heavy duty, steam-jacketed, pressure and vacuum equipped dough mixer. The mixer was then closed, the kneading action was commenced and steam was introduced into the jacket at 30 pounds pressure to maintain a pressure of 10 to 12 pounds gauge in the mixing chamber. The cooking was carried out at this pressure for a period of about 60 minutes. At the end of the cooking period the pressure in the jacket was released and the cooked dough was partially and rapidly dried in the mixer under vacuum to about 30 per cent moisture content. Thereafter the cooked, partially dried dough was formed into pellets by extruding through a die having circular openings roughly ⅛ inch in diameter and having a knife moving across the face of the die, cutting the extruded material to pellets of the desired size. The pellets were then immediately subjected to a flaking treatment and the resulting flakes were blistered, toasted and expanded by heating them in a stream of air to a temperature between about 450° and 675° F. The resulting flakes were well blistered and well expanded and were crisp and crunchy and stood up well in milk. In physical form they were very nearly like corn and rice flakes.

Example 2

In order to prepare a shredded oat biscuit, 100 parts of solvent-extracted pearled oat groats containing less than one per cent fat prepared as suggested above were placed in a Johnson cylindrical rotating type cooker together with 30 parts of water. The mixture was then pressure cooked for a period of 47 minutes by injecting steam at about 10 pounds pressure directly into the mass while rotating the cooker at a speed of about 8 revolutions per minute. At the end of this period the oat groats were still in the form of free flowing individual grains and were processed by a conventional method of making shredded biscuits which includes the steps of shredding by passing through a pair of even speed rollers, one of which was provided with a plurality of peripherally extending channels or grooves to form a desired shredded product. The shreds were then formed into the form of the biscuit and the resulting biscuit was toasted at 450–550° F. and then dried at about 230° F. in accordance with conventional processes.

The resulting shredded oat biscuit was strong and still possessed a delicate friable structure characteristic of shredded wheat biscuits. With this improved process employing the defatted oat constituents, the amount of breakage which occurred during the processing and toasting operation was actually less than that which occurs in the regular process for the production of shredded wheat biscuits. Shredded oat biscuits made in accordance with this example are crisp and crunchy and stand up well in milk.

Example 3

As a further example illustrating the novelty and advantages of this invention, defatted pearled oat groats containing less than one per cent by weight of fat were preheated in an air oven to about 160° F. and then placed in a puffing chamber or gun. Superheated steam at a temperature of about 600° F. was injected into the gun until a pressure of 190 pounds gauge was developed which was maintained for approximately 75 seconds. Thereafter the pressure was suddenly released by quickly opening the gun to produce a substantially dry puffed product. The product showed good expansion, there being no fraying of the kernels. Likewise there was no bitterness in the product which is characteristic of puffed oats manufactured from regular undefatted oat groats. When full fat oat groats are puffed, the total expansion is about six times, while with the improved process of this invention the expansion was as much as twelve times which further illustrates the advantage of this process. The product prepared in accordance with this example was very tender and stood up well in cold milk or cream.

Example 4

The production of oat flakes from defatted oat groats demonstrates yet another advantage of this invention. By the conventional process for preparing cereal flakes from corn, rice or wheat, the grain or grits are pressure cooked for a period of about two hours in a rotating cooker into which steam is injected at about 10 pounds pressure. The cooked grains are then dried from about 33 to about 18 per cent moisture content after which the partially dried cooked cereal grains are allowed to temper for about 16 to 20 hours to permit equalization of moisture within and between the cereal kernels. The tempered grains are then subjected to a flaking treatment between differential speed rollers and the resulting flakes are toasted at a temperature above about 450° F. in any suitable manner. Such a process produces satisfactory flakes when applied to corn, rice or wheat but when applied to full fat oats few flakes are obtained and such as are produced are very unsatisfactory. In fact, they are mealy, lacking in crispness and crunchiness and rapidly disintegrate into a mush when placed in milk.

However, oat groats were defatted and then subjected to the above indicated procedure, and the resultant product had none of the foregoing disadvantages. With the process of this invention as applied to defatted oat groats, it is possible to obtain intermediate flakes (prior to toasting) which exhibit a thin, rubbery, fused structure characteristic of corn and rice flakes, which may be toasted to form a very satisfactory flaked oat product. With the improved process the amount of breakage which occurs during the flaking and toasting operation is no greater than the amount of breakage which occurs in the regular production of corn and rice flakes. The improved toasted flakes are crisp and crunchy and stand up well in cold milk or cream. They possess none of the mealiness and bitterness which is characteristic of prior art oat flakes made from full fat oat groats.

Example 5

Further illustrating the advantages of this invention, 100 parts of pearled defatted oat groats were placed in a Johnson type cylindrical rotating cooker together with 30 parts of water and the mixture was pressure cooked for a period of 47 minutes by injecting steam at about 10 pounds pressure directly into the mass. During the entire cooking process the cooker was rotated at a speed of about 8 revolutions per minute. After cooking, the grains were partially dried to a moisture content of between 30 to 40 per cent and then passed between rolls adjusted so that the grains were flattened but not flaked in the manner disclosed in United States Patent No. 2,295,116. The flattened groats were then dried to a moisture content of about 10 to 15 per cent and explosively puffed. The product was similar in many respects to that obtained in accordance with Example 3 above except that the texture of the grain had been definitely altered to give a more crunchy product. If the process of this example is carried out with a full fat oat groat, no expanded product will be produced.

Example 6

Defatted rolled oats having a content of about 0.76 per cent fat were pulverized to a flour and 125 parts by weight of the defatted oat flour was placed in the mixing chamber of a heavy duty steam-jacketed pressure and vacuum-equipped dough mixer. Eighty (80) parts by weight of water, 10 parts of non-diastatic malt syrup, 5 parts of white cane sugar and 5 parts of salt were then added, the dough mixer closed and kneading action commenced. The dough mixture was cooked by turning steam into the jacket up to 30 pounds pressure and the internal pressure within the dough mixer was maintained by a relief valve at about 10 to 12 pounds. After cooking was complete after about 60 minutes, the internal pressure was released in the dough mixer and the cooked oat dough was rapidly dried to about 30 per cent moisture by the application of a vacuum. The partially dried dough was then removed from the mixer, sheeted and dried to a moisture content of 10 to 12 per cent. The dried sheets were then cut into flakes and contacted with dry granular salt in a rotary kiln at a temperature between 350° to 450° F. which resulted in puffing of the product. The resulting flakes were then mechanically separated from salt. This product was crisp, tender, and held its body well when immersed in milk for a period of several minutes.

As previously emphasized, it has not been possible by prior art methods to prepare a fully satisfactory oat product of the ready-to-eat breakfast food type. These products which are normally prepared by a process including the step of cooking oat components to a temperature at least equal to that of the boiling point of water tend to develop characteristics heretofore specified which seriously limit their customer appeal. An important feature of this invention is the combination of a defatting step with the cooking step whereby the oat components are modified by heat to render them ready to eat and whereby certain normally present undesirable characteristics of the prior art oat products are substantially eliminated.

In the foregoing examples particular reference has been made to the preparation of oat products of the ready-to-eat breakfast food type. It has been found, however, in accordance with this invention that other types of food products consisting essentially of oat components may be markedly improved with respect to their taste characteristics when defatted oat constituents are employed. The defatting step contributes to the production of an improved product from oats such as has heretofore not been obtainable in the food industry.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process of preparing a cooked oat food product containing oat grain components as its essential ingredient and characterized by its improved flavor and palatability which comprises defatting milled oat components by solvent extraction substantially to reduce the fat content thereof, separating solvent from the defatted product, and cooking the defatted product with water at a temperature at least equal to that of the boiling temperature of water.

2. A process of preparing a cooked oat food product containing oat grain components as its essential ingredient and characterized by its improved flavor and palatability which comprises disrupting the outer bran layer present in milled oat grains, subjecting the thus treated grains to solvent extraction to reduce the fat content thereof to less than about 2% by weight, separating solvent from the defatted product, cooking the defatted product at a temperature at least equal to that of the boiling temperature of water and drying the cooked product to form a dry, ready-to-eat breakfast food.

3. A process of producing a puffed oat product of the ready-to-eat breakfast food type characterized by its improved flavor and palatability and by its ability to maintain its tenderness, crispness and crunchiness after being mixed with cold aqueous fluids such as milk or cream which comprises subjecting pearled oat groats to solvent extraction to reduce the fat content thereof to less than about 1% by weight, separating solvent from the defatted product, subjecting the resulting product to high pressure, dry steam, and thereafter suddenly releasing the pressure whereby the desired product is produced in a substantially dry condition.

4. A process of producing a substantially dry, toasted oat product of the ready-to-eat breakfast food type characterized by its improved flavor and palatability and by its ability to maintain its tenderness, crispness and crunchiness after being mixed with cold aqueous fluids such as milk or cream which comprises defatting milled oat components by solvent extraction to reduce the fat content thereof to less than about 1% by weight, separating solvent from the defatted product, cooking the defatted product with water, partially drying the cooked product, shaping to a desired form, and thereafter toasting.

5. A process of producing a substantially dry, toasted oat flake of the ready-to-eat breakfast food type characterized by its improved flavor and palatability and by its ability to maintain its tenderness, crispness and crunchiness after being admixed with cold aqueous fluids such as milk or cream which comprises subjecting oat groats to solvent extraction to reduce the fat content thereof to less than about 1% by weight, separating solvent from the defatted groats, cooking the resulting groats with water under steam pressure to form individual cooked grains which are capable of mechanical deformation into flake form, partially drying the cooked grains, tempering the partially dried grains to allow equalization of moisture content therebetween, flaking the tempered grains, and thereafter toasting the resulting flakes to form the desired product.

6. A process of producing a substantially dry, toasted and shredded oat biscuit of the ready-to-eat breakfast food type characterized by its improved flavor and palatability and by its ability to maintain its tenderness, crispness and crunchiness after being placed in a cold aqueous fluid such as cream or milk which comprises subjecting pearled oat groats to solvent extraction to reduce the fat content thereof to less than about 1% by weight, separating solvent from the defatted groats, cooking the resulting groats with water to form individual cooked grains, shredding the cooked grains, forming the shredded grains into a biscuit, and thereafter toasting and drying the resulting biscuit.

7. A process of making blistered, toasted and friable oat flakes capable of maintaining their tenderness, crispness and crunchiness after being mixed with cold aqueous fluids such as cream or milk, which comprises mixing an oat flour having less than 1% by weight of fat and water in proportions to form a dough, cooking said dough under pressure in a cooker with simultaneous agitation until a noncrumbling, rubbery, cooked dough is formed, applying a partial vacuum to said cooker after the cooking operation rapidly to remove a portion of the water within said cooker, removing the cooked dough from said cooker, forming said dough into flakes, and toasting said flakes at a temperature above about 450° F. whereby the desired product is formed.

ELDOR G. RUPP.

REFERENCES CITED

The following references are of record in the file of this patent:

UNITED STATES PATENTS

| Number | Name | Date |
|---|---|---|
| Re. 22,748 | Levin | Apr. 30, 1946 |
| 1,524,051 | Nixon | Jan 27, 1925 |
| 1,839,928 | Perky | Jan. 5, 1932 |
| 1,890,697 | Scanlon | Dec. 13, 1932 |
| 1,923,684 | Perky | Aug. 22, 1933 |
| 2,011,050 | Greenwood | Aug. 13, 1935 |
| 2,071,434 | Sarnmark | Feb. 23, 1937 |
| 2,127,782 | McShane | Aug. 23, 1938 |
| 2,295,116 | Kellogg | Sept. 8, 1942 |
| 2,314,282 | Levin | Mar. 16, 1943 |
| 2,388,904 | Collatz | Nov. 13, 1945 |

FOREIGN PATENTS

| Number | Country | Date |
|---|---|---|
| 26,792 | Australia | of 1930 |